United States Patent [19]

Tucholski

[11] 4,146,685

[45] Mar. 27, 1979

[54] MOLDED METAL OXIDE ELECTRODES CONTAINING AN ETHYLENE ACRYLIC ACID ADDITIVE

[75] Inventor: Gary R. Tucholski, Parma Heights, Ohio

[73] Assignee: Union Carbide Corporation, New York, N.Y.

[21] Appl. No.: 890,972

[22] Filed: Mar. 28, 1978

[51] Int. Cl.$^2$ .................. H01M 4/62; H01M 4/88
[52] U.S. Cl. .................. 429/206; 252/182.1; 429/217
[58] Field of Search ............... 429/217, 206, 212, 213, 429/214, 215; 252/182.1; 264/104

[56] References Cited

U.S. PATENT DOCUMENTS

| | | | |
|---|---|---|---|
| 2,902,530 | 9/1959 | Eisen | 429/217 |
| 3,120,457 | 2/1964 | Duddy | 156/6 |
| 3,184,339 | 5/1965 | Ellis | 264/104 |
| 3,531,325 | 9/1970 | Lux et al. | 264/272 |
| 3,830,661 | 8/1974 | Tsuchida et al. | 252/182.1 |
| 3,918,989 | 11/1975 | Gillman et al. | 429/206 |
| 4,056,664 | 11/1977 | Jaffe | 429/217 |

FOREIGN PATENT DOCUMENTS 48-16086  5/1973  Japan.
48-19446  6/1973  Japan.

*Primary Examiner*—Donald L. Walton
*Attorney, Agent, or Firm*—Cornelius F. O'Brien

[57] ABSTRACT

A method for producing a molded metal oxide electrode such as a silver oxide electrode and the electrode so produced for use in electrochemical cells, such as alkaline-zinc cells, which comprises a metal oxide and a minor amount of an ethylene acrylic acid polymer.

19 Claims, No Drawings

MOLDED METAL OXIDE ELECTRODES CONTAINING AN ETHYLENE ACRYLIC ACID ADDITIVE

FIELD OF THE INVENTION

The invention relates to a method for producing a molded metal oxide electrode and the molded electrode so produced for use in electrochemical cells which comprises a metal oxide, such as silver oxide, and an amount of an ethylene acrylic acid polymer preferably between about 0.5 and 10 weight percent of the dry powder constituents of the metal oxide electrode.

BACKGROUND OF THE INVENTION

Miniature button alkaline metal oxide cells, such as alkaline silver oxide cells, have gained wide commercial acceptance for many applications because they are characterized as being high capacity, small volume electric cells. In other words, they have a high power output and energy per unit weight and unit volume of active cathode material. One of the major disadvantages of divalent silver oxide cells is that they discharge at two successive different potentials. This is due to the fact that the active materials of such cells are first divalent silver oxide (AgO) which is then reduced to monovalent silver oxide ($Ag_2O$). Silver oxide cells using monovalent silver oxide as the only active cathode material will have a theoretical unipotential discharge at about 1.57 volts but the capacity in milliampere hours per gram of monovalent silver oxide is substantially lower than the capacity with divalent silver oxide. On the other hand, silver oxide button cells [0.455 inch (1.16 cm diameter) by 0.210 inch (0.533 cm high)] using only divalent silver oxide as the starting active cathode material will discharge at a first potential at about 1.7 volts across a 300-ohm resistor for the first 40 hours of discharge, for example, and then drop to approximately 1.5 volts for the balance of the useful discharge life. Thus, monovalent silver oxide cells having the advantage of discharging at a single unipotential plateau but with some sacrifice in capacity as compared with divalent silver oxide cells which have the advantage of having a much higher capacity but with the disadvantage of discharging at two successive distinct voltage plateaus. Divalent silver oxide has about 1.9 times more capacity per gram than monovalent silver oxide and about 2 times more capacity per unit volume than monovalent silver oxide.

Many cell or battery applications, particularly in transistorized devices such as hearing aids, watches, calculators and the like, require an essentially unipotential discharge source for proper operation and, therefore, cannot effectively use the dual voltage level discharge which is normally characteristic of divalent silver oxide cells.

Consequently, many methods have been proposed for obtaining a unipotential discharge from a divalent silver oxide cell without undue sacrifice in capacity. One method disclosed in U.S. Pat. Nos. 3,615,858 and 3,655,450 entails providing a continuous layer of monovalent silver oxide in physical and electrical contact with a divalent silver oxide pellet. During assembly of the cell, the cathode pellet is disposed against the inner surface of a cathode cup or collector whereupon the layer of monovalent silver oxide physically isolates the divalent silver oxide from contact with the cathode cup so that the sole electronic path for discharge of the divalent silver oxide is through the monovalent silver oxide layer.

In U.S. Pat. No. 3,476,610 a silver oxide battery is disclosed which employs a positive electrode comprised mainly of divalent silver oxide with the addition of monovalent silver oxide present in part as an electrolyte-impermeable masking layer. This layer isolates the divalent silver oxide from contact with the electrolyte of the battery until discharge begins whereupon the monovalent silver oxide becomes electrolyte-permeable. When this occurs, the electrolyte then begins to contact the divalent silver oxide. In addition, the monovalent silver oxide is also present as an interposed layer between the divalent silver oxide and the inner surface of the cathode cup or collector so as to isolate the divalent silver oxide from electronic contact with said cathode cup which is the positive terminal of the cell.

In U.S. Pat. No. 3,484,295 a silver oxide battery is disclosed which utilizes a positive silver electrode comprising divalent silver oxide and monovalent silver oxide. The latter oxide is employed as an electrolyte-impermeable layer which is interposed between the divalent silver oxide and the battery components containing the electrolyte so as to isolate the divalent silver oxide from contact with the electrolyte until the monovalent silver material is discharged. If the discharge product of the monovalent silver material is continually reoxidized by the divalent silver material in the presence of the battery electrolyte, then it is possible that the battery will yield a unipotential discharge.

In U.S. Pat. No. 3,920,478 a silver oxide cell is disclosed which employs a positive electrode comprising divalent silver oxide housed in a positive cathode container, and interposed between the positive electrode and the inner wall of the cathode container and/or between the positive electrode and the separator is a discontinuous oxidizable metal, such as a zinc screen, which functions to reduce a portion of the divalent silver oxide to monovalent silver oxide which isolates the divalent silver oxide portion of the positive electrode from the container so as to produce a unipotential discharge on low drain conditions.

In U.S. Pat. No. 3,925,102 a silver oxide cell is disclosed which employs a positive electrode comprising divalent silver oxide housed in a positive electrode container having an upstanding wall and a closed end. Interposed between the positive electrode and the inner upstanding wall is an oxidizable zinc ring which functions to reduce a portion of the divalent silver oxide to monovalent silver oxide which isolates the divalent silver oxide portion of the positive electrode from the container so as to produce a unipotential discharge on low drain conditions.

The silver oxide electrodes for use in the above-described cells are generally molded into inflexible pellet-type solid electrodes with the aid of a lubricant. The presence of many of the conventional lubricants, such as graphite, in molded silver oxide electrodes containing divalent silver oxide has been found to adversely affect the shelf life of the cells employing such electrodes and/or the unipotential discharge characteristic of the cells.

Accordingly, it is an object of the present invention to provide a metal oxide electrode for electrochemical cells which comprises a metal oxide and a minor amount of solid ethylene acrylic acid polymer.

Another object of this invention is to provide a silver oxide electrode for electrochemical cells which comprises divalent silver oxide and a minor amount of an ethylene acrylic acid polymer.

Another object of this invention is to incorporate a minor amount of an ethylene acrylic acid polymer into a divalent silver oxide-containing material so as to provide lubricity and cohesion to the mixture so that said mixture can be easily molded into a substantially cohesive inflexible body which can be easily handled.

Another object of this invention is to provide a porous positive electrode for silver oxide cells which comprises divalent silver oxide and a minor amount of an ethylene acrylic acid polymer and which electrode will exhibit good electrolyte absorption characteristics.

Another object of this invention is to provide a method for producing a molded metal oxide electrode.

SUMMARY OF THE INVENTION

The invention relates to a molded metal oxide electrode, such as a silver oxide electrode, for use in electrochemical cells which comprises a metal oxide, such as divalent silver oxide, and a minor amount of an ethylene acrylic acid polymer, for example, between about 0.5 and about 10 weight percent, preferably between about 1.0 and about 2 weight percent, based on the weight of the dry powder constituents of the metal oxide electrode. The ethylene acrylic acid polymer (EAA) for use in this invention is a solid copolymer of ethylene and acrylic acid, preferably in powder form.

A method for producing a molded metal oxide electrode comprising the steps:

(a) mixing a metal oxide powder with a minor amount of an ethylene acrylic acid polymer, for example, between about 0.5 and about 10 weight percent based on the weight of the metal oxide powder; and (b) compacting a metered portion of the mixture of step (a) to form a pressed, molded metal oxide electrode.

Metal oxides for use in the process of this invention comprise silver oxide (monovalent and divalent), mercury oxide, cadmium oxide, manganese dioxide, nickel oxide, nickel hydroxide, and mixtures thereof.

The ethylene acrylic acid additive for use in molding metal oxide electrodes, such as silver oxide electrodes, of this invention has been found to be a multipurpose additive having the following advantages:

(1) The primary advantage is that the ethylene acrylic acid copolymer additive functions as a lubricant and a flow agent in the pressure molding of metal oxide electrodes, such as electrode pellets.

(2) The ethylene acrylic acid additive also functions as a binder in the metal oxide electrode and, therefore, imparts greater mechanical strength to a molded electrode.

(3) The ethylene acrylic acid is a hydrophilic material which, when mixed with a metal oxide and then suitably molded into a cohesive porous form, will produce a porous electrode having excellent electrolyte absorption characteristics with respect to both rate of absorption and volume of absorbate.

The addition of an ethylene acrylic acid polymer in a properly constructed divalent silver oxide-monovalent silver oxide-containing electrode for use in an alkaline cell system will not interfere with cell operation and thus will enable the cell to exhibit a monovalent voltage output with greater reliability than an otherwise identical cell with the exception that the electrode employs a different lubricant, such as graphite, rather than ethylene acrylic acid polymer.

As used herein, a silver oxide electrode shall mean an electrode wherein the active cathode material is divalent silver oxide or an electrode wherein the major active material is divalent silver oxide in conjunction with an amount below 50% by weight of monovalent silver oxide and/or some other electrochemically active cathode material.

The minor amount of the ethylene acrylic acid additive for use in the electrode of this invention should be between about 0.5 and about 10 percent based on the weight of the dry powder constituents of the electrode and preferably between about 1 and 2 weight percent based on the weight of the dry powder constituents of the electrode. An amount of ethylene acrylic acid polymer less than, for example, about 0.5 weight percent, would not provide sufficient lubricity to the electrode mix for reliable and efficient molding and would not impart adequate cohesion to the molded electrode formed therefrom. An amount of ethylene acrylic acid polymer more than, for example, about 10 weight percent added to the electrode mix would be detrimental to cell capacity since too much of the high capacity active cathode material would be physically replaced by the ethylene acrylic acid polymer which is not an active reducible material. Consequently, the amount of the ethylene acrylic acid polymer to be added should preferably be the minimum amount that will give good flow lubricity to the active cathode mix and cohesion to the electrode so formed.

The percent packing of the compressed mix should be at least above 65.

It is also within the scope of this invention to additionally add a minor amount of a stabilizer, a flow agent and/or a lubricating agent to the active cathode mix, such as a silver oxide mix, to further alter the physical characteristics of the mix for molding purposes to produce various size and type electrodes. Examples of some of these additives are ethylene bisstearamide, zinc stearate, lead stearate, calcium stearate, and the like.

Silver oxide electrodes of this invention may be employed in an aqueous cell system using an anode such as zinc, cadmium, indium, or the like. The electrode couple so selected can be employed with a compatible electrolyte and preferably an alkaline electrolyte. Examples of suitable electrolytes include alkaline earth metal hydroxides, such as strontium hydroxide and alkali metal hydroxides, exemplified by sodium hydroxide, potassium hydroxide, lithium hydroxide, rubidium hydroxide and cesium hydroxide. Compatible mixtures of the preceding may be utilized. Preferably, the molded electrode of this invention should be porous so that the walls of the pores and interstices of the electrode can become wetted by the electrolyte.

The silver oxide electrode of this invention can also be employed in non-aqueous cell systems employing an anode such as lithium, sodium, potassium, calcium, magnesium, or their alloys. Again, the electrode couple so selected should be employed with a compatible nonaqueous electrolyte which preferably will not dissolve or otherwise attack the ethylene acrylic acid additive.

EXAMPLE I

To demonstrate the increased pellet strength and the excellent electrolyte absorption characteristics of the pellet made in accordance with this invention, pellets were molded from each of the silver oxide-containing mixes shown in Table 1. The pellets measured 0.435 inch (1.1 cm) in diameter by 0.051 inch (0.13 cm), weighed about 0.64 gm and had a density as shown in Table 1.

A 33 percent by weight potassium hydroxide electrolyte was fed on top of each pellet and after six minutes the amount of electrolyte absorbed into the pellets was observed. The average electrolyte absorption and pellet break strength measurements for five cathode pellets were calculated and are shown in Table 1. These data clearly demonstrate that the ethylene acrylic acid-containing pellets had superior electrolyte absorption characteristics and strength over 100% divalent silver oxide pellets and divalent silver oxide pellets containing a minor amount of lead stearate.

TABLE 1

| Cathode Mix Composition | Avg. Density (gm/in$^3$) | Absorbed Electrolyte (milligrams) | (1) Pellet Strength (Dry) (kilograms) |
|---|---|---|---|
| 100% AgO | 85 | 47 | 9.8 |
| 99.5% AgO, 0.5% lead stearate* | 85 | 42 | 9.8 |
| 99% AgO, 1% EAA** | 86 | 52 | 13.2 |

*Lead stearate was added as a lubricant to facilitate molding of the pellets.
**The particular EAA material used was a solid powder and had anacrylic acid content of 20%, a DTA melting point of 95° C and a melt index of 50 gm/10 min. at 190° C.
(1)The average break strength as determined by Stokes hardness tester (F.J. Stokes Machine Co., Phila., Pa.)

EXAMPLE II

To further demonstrate the excellent electrolyte absorption characteristics of the silver oxide electrodes of this invention, seven pellets were molded from each of the silver oxide-containing mixes shown in Table 2. The pellets measured 0.434 inch (1.1 cm) in diameter, 0.023 inch (0.058 cm) high, and weighed about 0.30 gram.

Eighteen milligrams of a 33 percent potassium hydroxide electrolyte were fed on top of each pellet and the time required for the electrolyte to be completely absorbed into the pellet was observed. The time range observed for four pellets made from each of the cathode mixes along with the average pellet strength of the remaining three pellets as obtained from using a Stokes Hardness tester are shown in Table 2. These data clearly demonstrate that the ethylene acrylic acid polymer-containing AgO/Ag$_2$O pellets had superior electrolyte absorption characteristics and pellet strength over AgO/Ag$_2$O pellets containing a minor amount of the lubricant, lead stearate.

TABLE 2

| Cathode Mix Composition | Avg. Density (gm/in$^3$) | Absorption** Time for 18 milligrams (minutes) | Pellet*** Strength (kilograms) |
|---|---|---|---|
| 80% AgO, 19% Ag$_2$O and 1% EAA | 92 | 3-6 | 8.4 |
| 80% AgO, 19¾% Ag$_2$O and ¼% lead stearate* | 93 | 9-16 | 6.9 |

*Lead stearate was added as a lubricant to facilitate molding of the pellets.
**Measured range for four pellets.
***Average reading of three pellets.

EXAMPLE III

Several lots of cells, each cell sized 0.455 inch (1.16 cm) in diameter by 0.105 inch (0.267 cm) high, were made using a molded cathode of 80 percent divalent silver oxide, 16.1 to 19.75 percent monovalent silver oxide and the remainder a lubricant, specifically lead stearate, EAA polymer, or graphite; a zinc anode and a 33 percent potassium hydroxide electrolyte. A separator, composed of a fibrous sheet and a laminate consisting of a layer of cross-linked polyethylene and a layer of cellophane having a gold metallized coating on the polyethylene side, was disposed between the zinc anode and the silver oxide electrode. The gold metallized side of the laminate (polyethylene side) was in contact with the silver oxide electrode. To insure a monovalent silver oxide voltage output, a zinc screen was placed between the cathode and the nickel-plated cathode container as taught in U.S. Pat. No. 3,920,478. To complete the cell assembly, a gold-plated, copper clad, stainless steel anode cup containing the anode and nylon gasket was radially sealed by the conventional swaging and crimping technique.

Each lot of these cells was tested in several ways and the data so obtained are shown in Tables 3 to 9.

Tables 3 and 4 show the anode and cathode compositions used in the test cells. Table 5 shows open circuit voltages as a function of time at 21° C. Table 6 shows the number of test cells whose open circuit voltages were below 1.80 volts after specified storage periods at 21° C. Table 7 shows closed circuit voltages on 62,000-ohm continuous discharge. The numbers shown are the average voltages for each lot of cells under the conditions indicated in the table. Table 8 shows the average closed circuit voltages at the end of a two-second discharge on 30 and 100 ohms after the storage periods (at 21° C.) indicated in the table. Table 9 shows the results of cell bottom bulging measurements. The values shown are the average and maximum bulge measurements after storage under the conditions indicated expressed as 0.001-inch increments (i.e., 2.6 = 0.0026-inch bulge).

TABLE 3

ANODE COMPOSITIONS

| Test Lot No. | % Zinc | % Hg | % CMC | % 45% KOH | % H$_2$O | Ave. Anode Wgt. (gm) |
|---|---|---|---|---|---|---|
| 1 | 65.0 | 3.9 | 3.18 | 20.47 | 7.45 | .147 |
| 2 | 65.0 | 3.9 | 3.18 | 20.47 | 7.45 | .147 |
| 3 | 66.5 | 4.0 | 3.2 | 19.5 | 6.8 | .144 |
| 4 | 66.5 | 4.0 | 3.2 | 19.5 | 6.8 | .144 |
| 5 | 66.5 | 4.0 | 3.2 | 19.5 | 6.8 | .145 |
| 6 | 66.5 | 4.0 | 3.2 | 19.5 | 6.8 | .145 |

TABLE 4

CATHODE COMPOSITIONS

| Test Lot No. | % AgO | % Ag$_2$O | % EAA | % lead Stearate | % Graphite | Ave. Cath. Wgt. (gm) |
|---|---|---|---|---|---|---|
| 1 | 80 | 19¾ | 0 | ¼ | 0 | .334 |
| 2 | 80 | 19 | 1 | 0 | 0 | .309 |
| 3 | 80 | 19¾ | 0 | ¼ | 0 | .323 |
| 4 | 80 | 19 | 1 | 0 | 0 | .308 |
| 5 | 80 | 19 | 1 | 0 | 0 | .301 |
| 6 | 77.7 | 18.4 | 1 | 0 | 2.9 | .313 |

TABLE 5

MONOVALENT VOLTAGE CONTROL

| Test Lot No. | Lubricant Added to Cathode | [1]Average OCV (volts) | | | | |
|---|---|---|---|---|---|---|
| | | One Week | One Month | Three Months | Six Months | Nine Months |
| 5 | 1% EAA | 1.599 | 1.602 | 1.738 | 1.636 | |
| 6 | 1% EAA and 2.9% Graphite | 1.847 | 1.856 | 1.848 | 1.848 | |
| 1 | ¼% lead stearate | 1.778 | 1.849 | 1.849 | 1.840 | 1.826 |
| 2 | 1% EAA | 1.606 | 1.648 | 1.744 | 1.698 | 1.708 |

TABLE 5-continued

MONOVALENT VOLTAGE CONTROL

| Test Lot No. | Lubricant Added to Cathode | [1]Average OCV (volts) | | | | |
|---|---|---|---|---|---|---|
| | | One Week | One Month | Three Months | Six Months | Nine Months |
| 3 | ¼% lead stearate | 1.788 | 1.779 | 1.849 | 1.847 | — |
| 4 | 1% EAA | 1.594 | 1.649 | 1.761 | 1.795 | — |

Notes:
OCV = open circuit voltage
[1]5 cells per lot tests

TABLE 6

| Test Lot No. | Lubricant Added to Cathode | Cells Below 1.80 OCV (voltage) | | | | |
|---|---|---|---|---|---|---|
| | | One Week | One Month | Three Months | Six Months | Nine Months |
| 5 | 1% EAA | 60/60* | 22/22 | 22/22 | 22/22 | |
| 6 | 1% EAA and 2.9% Graphite | 0/16 | 0/6 | 0/6 | 0/6 | |
| 1 | ¼% lead stearate | 16/53 | 0/6 | 0/6 | 1/6 | 1/6 |
| 2 | 1% EAA | 52/52 | 5/5 | 5/5 | 5/5 | 5/5 |
| 3 | ¼% lead stearate | 13/60 | 3/8 | 0/11 | 0/11 | — |
| 4 | 1% EAA | 59/59 | 7/8 | 3/8 | 2/8 | — |

*top number is number of cells having specified voltage; bottom number is total number of cells in the test

TABLE 7

| Test Lot No. | Lubricant Added to Cathode | Cell Age Mo. | Monovalent Voltage Test (62K ohm continuous) [1]Average Voltage and Number of Cells at Monovalent Potential[2] | | | | | |
|---|---|---|---|---|---|---|---|---|
| | | | OCV | CCV | 1 min CCV | 5 min CCV | 10 min CCV | 15 min CCV |
| 5 | 1% EAA | 6 | 1.733[0] | 1.616[0] | 1.571[5] | 1.572[5] | 1.573[5] | 1.573[5] |
| 6 | 1% EAA and 2.9% Graphite | 6 | 1.840[0] | 1.826[0] | 1.815[0] | 1.811[0] | 1.809[0] | 1.808[0] |
| 1 | ¼% lead stearate | 9 | 1.845[0] | 1.796[0] | 1.759[0] | 1.746[1] | 1.742[1] | 1.736[1] |
| 2 | 1% EAA | 9 | 1.708[1] | 1.592[5] | 1.571[5] | 1.573[5] | 1.573[5] | 1.573[5] |
| 3 | ¼% lead stearate | 6 | 1.846[0] | 1.728[0] | 1.633[3] | 1.603[4] | 1.598[4] | 1.592[4] |
| 4 | 1% EAA | 6 | 1.822[0] | 1.732[0] | 1.590[4] | 1.572[5] | 1.572[5] | 1.572[5] |

Notes:
[1]5 cells per lot tested
[2]monovalent volage ~ 1.60
OCV = open circuit voltage
CCV = closed circuit voltage

TABLE 8

| Test Lot No. | | [1]Average CCV for 2 second discharge | | | | | | | | |
|---|---|---|---|---|---|---|---|---|---|---|
| | | One Week | | One Month | | 3 Months | | 6 Months | | 9 Months | |
| | | 30 Ω | 100 Ω | 30 Ω | 100 Ω | 30 Ω | 100 Ω | 30 Ω | 100 Ω | 30 Ω | 100 Ω |
| 1 | ¼% lead stearate | 1.26 | 1.41 | 1.23 | 1.43 | 1.11 | 1.38 | 1.06 | 1.35 | .99 | 1.38 |
| 2 | 1% EAA | 1.32 | 1.43 | 1.34 | 1.44 | 1.30 | 1.43 | 1.28 | 1.41 | 1.29 | 1.39 |
| 3 | ¼% lead stearate | 1.20 | 1.40 | 1.07 | 1.27 | 1.12 | 1.29 | .98 | 1.29 | — | — |
| 4 | 1% EAA | 1.23 | 1.37 | 1.24 | 1.39 | 1.26 | 1.32 | 1.21 | 1.25 | — | — |
| 5 | 1% EAA | 1.23 | 1.29 | 1.25 | 1.43 | 1.26 | 1.34 | 1.28 | 1.39 | — | — |
| 6 | 1% EAA and 2.9% Graphite | 1.54 | 1.68 | 1.67 | 1.78 | 1.52 | 1.60 | 1.40 | 1.64 | — | — |

Notes:
[1]5 cells per lot tested

TABLE 9

| Sample Lot No. | Lubricant added to Cathode | *Bulge 4 Wks. at 54° C. | | *Bulge 8 Wks. at 54° C. | | *Bulge 12 Wks. at 54° C. | | *Bulge 3 Mo. at 45° C. | | *Bulge[2] 6 Mo. at 45° C. | |
|---|---|---|---|---|---|---|---|---|---|---|---|
| | | Ave | Max | Ave | Max | Ave | Max | Ave | Max | Ave | Max |
| 1 | ¼% lead stearate | 2.6 | 4 | 0.4 | 1 | 0 | 1 | − 0.6 | 1 | − 3.0 | − 3 |
| 2 | 1% EAA | 0.4 | 1 | 0.0 | 0 | 0.6 | 1 | − 0.6 | 1 | − 1.5 | − 1 |
| 3 | ¼% lead stearate | 0.4 | 2 | 0.5 | 1 | − 0.6 | 0 | − 0.6 | 0 | − 1.5 | − 1 |
| 4 | 1% EAA | 1.2 | 2 | 0.8 | 2 | 2.4 | 4 | 0 | 0 | − 1.0 | − 1 |
| 5 | 1% EAA | 1.4 | 2 | 1.6 | 3 | 0.2 | 1 | 0.6 | 2 | | |
| 6 | 1% EAA & 2.9% Graphite | not available | | | | | | − 1.3 | − 1 | | |

*Ave. bulge and maximum bulge given in .001 inch increments
[2]At 21° C. all lots averaged between 1 and 2 mils negative bulge after 7 to 10 months ("negative bulge" and the negative numbers in the table refer to a decrease in cell height which often occurs on storage)

The meaning of the above data shown in Tables 5 through 9 can be summarized as follows:

1. As shown in Tables 5 and 6, the monovalent voltage of 1.56 to 1.60 volts is more reliably achieved when EAA polymer is used only as the cathode molding lubricant. This was determined by the monthly OCV measurements.

2. As shown in Table 7, cells containing graphite in the active cathode did not exhibit monovalent voltage control on the 62,000-ohm continuous discharge test, thus demonstrating that they are not commercially usable in applications requiring the standard 1.60 volts. All cells in which EAA polymer was used as the only cathode molding lubricant exhibited the desired monovalent voltage on the 62,000-ohm test.

3. As shown in Table 8, cells containing graphite in the active cathode exhibit the best performance on the two-second long 30- or 100-ohm pulse test; however, these cells did not exhibit the desired monovalent voltage, again demonstrating their lack of commercial utility in this type of application.

4. Cells containing EAA polymer as the lubricant in the active cathode exhibit higher closed circuit voltages on the high drain 30-ohm pulse, when compared with cells using lead stearate as the lubricant. Although the closed circuit voltages obtained in this test were higher with graphite than with EAA polymer, cells containing only the latter consistently displayed the desired monovalent voltage.

5. The data shown in Table 9 clearly demonstrate that the cells using silver oxide electrodes fabricated with the EAA polymer lubricant exhibited a low bulge under the indicated storage conditions at various temperatures. Since bulging was in the same range in all cases, these data indicate that EAA polymer does not have a detrimental effect on the stability of the cells after storage.

In actual practice, it is not feasible to make certain metal oxide cathode pellets, such as silver oxide cathode pellets, without a lubricant due to the tableting press "freezing up" after only a short period of operation. Further, it has been found that the use of EAA as the lubricant for the metal oxide cathode mix will not adversely affect the functioning of the cathode in a cell system, such as a silver oxide electrode in a zinc-KOH system.

It is to be understood that other modifications and changes to the preferred embodiments of the invention herein shown and described can also be made without departing from the spirit and scope of the invention.

What is claimed is:

1. A molded metal oxide electrode for use in electrochemical cells which comprises a metal oxide and a minor amount of an ethylene acrylic acid polymer.

2. The molded metal oxide electrode of claim 1 wherein the metal oxide is selected from at least one of the oxides consisting of silver oxide (monovalent and divalent), mercury oxide, cadmium oxide, manganese dioxide, nickel oxide, and nickel hydroxide.

3. The metal oxide electrode of claim 1 wherein said ethylene acrylic acid polymer is present in an amount of between about 0.5 and about 10 weight percent based on the weight of the dry powder constituents of the metal oxide electrode.

4. The metal oxide electrode of claim 3 wherein said ethylene acrylic acid polymer is present in an amount of between about 1 and about 2 percent based on the weight of the dry powder constituents of the metal oxide electrode.

5. The metal oxide electrode of claim 2 wherein said ethylene acrylic acid polymer is present in an amount of between about 0.5 and about 10 weight percent based on the weight of the dry powder constituents of the metal oxide electrode.

6. The metal oxide electrode of claim 5 wherein said ethylene acrylic acid polymer is present in an amount of between about 1 and about 2 percent based on the weight of the dry powder constituents of the metal oxide electrode.

7. The metal oxide electrode of claim 1 wherein the metal oxide comprises divalent silver oxide.

8. The silver oxide electrode of claim 7 wherein said ethylene acrylic acid polymer is present in an amount of between about 0.5 and about 10 weight percent based on the weight of the dry powder constituents of the silver oxide electrode.

9. The silver oxide electrode of claim 7 wherein said electrode contains less than 50 percent by weight of monovalent silver oxide based on the weight of the dry powder constituents of the silver oxide electrode.

10. The silver oxide electrode of claim 9 wherein said ethylene acrylic acid polymer is present in an amount of between about 0.5 and about 10 weight percent based on the weight of the dry powder constituents of the silver oxide electrode.

11. The silver oxide electrode of claim 7 wherein said electrode contains a minor amount of a material selected from the group consisting of ethylene bis-stearamide, zinc stearate, lead stearate, and calcium stearate.

12. The silver oxide electrode of claim 11 wherein said ethylene acrylic acid polymer is present in an amount of between about 0.5 and about 10 weight percent based on the weight of the dry powder constituents of the silver oxide electrode.

13. An alkaline cell employing a zinc anode, a metal oxide electrode comprising divalent silver oxide and a minor amount of ethylene acrylic acid polymer, and a potassium hydroxide electrolyte.

14. The alkaline cell of claim 13 wherein the silver oxide electrode contains less than 50 percent by weight of monovalent silver oxide based on the weight of the dry powder constituents of the silver oxide electrode.

15. A method for producing a molded metal oxide electrode comprising the steps:
  (a) mixing a metal oxide powder with a minor amount of an ethylene acrylic acid polymer; and
  (b) compacting a metered portion of the mixture of step (a) to form a pressed, molded metal oxide electrode.

16. The method of claim 15 wherein said ethylene acrylic acid polymer is present in an amount of between about 0.5 and about 10 weight percent based on the weight of the metal oxide powder.

17. The method of claim 16 wherein said metal oxide is selected from at least one of the oxides consisting of silver oxide (monovalent and divalent), mercury oxide, cadmium oxide, manganese dioxide, nickel oxide, and nickel hydroxide.

18. The method of claim 17 wherein said metal oxide is divalent silver oxide.

19. The method of claim 17 wherein said metal oxide is divalent silver oxide and monovalent silver oxide.

* * * * *